United States Patent
Pincemin

(10) Patent No.: US 7,844,180 B2
(45) Date of Patent: *Nov. 30, 2010

(54) OPTICAL DEVICE AND A METHOD FOR CONVERTING WDM SIGNALS INTO AN OTDM SIGNAL AND VICE VERSA

(76) Inventor: Erwan Pincemin, Kernevez, Gommenec'h (FR) F-22290

( * ) Notice: Subject to any disclaimer, the term of this patent is extended or adjusted under 35 U.S.C. 154(b) by 0 days.

This patent is subject to a terminal disclaimer.

(21) Appl. No.: 12/434,796

(22) Filed: May 4, 2009

(65) Prior Publication Data
US 2009/0214217 A1    Aug. 27, 2009

Related U.S. Application Data

(63) Continuation of application No. 10/511,227, filed as application No. PCT/FR03/00810 on Mar. 13, 2003, now Pat. No. 7,577,363.

(30) Foreign Application Priority Data
Apr. 19, 2002    (FR)    ................... 02 04968

(51) Int. Cl.
*H04J 4/00* (2006.01)
*H04J 14/00* (2006.01)
*H04J 14/08* (2006.01)

(52) U.S. Cl. .............. 398/75; 398/79; 398/80; 398/98; 398/101; 398/102; 398/178; 398/179

(58) Field of Classification Search .......... 398/43, 398/47, 74, 75, 79, 80, 98, 186, 191, 201; 359/1, 245, 326
See application file for complete search history.

(56) References Cited

U.S. PATENT DOCUMENTS
5,726,789 A    3/1998   Horiuchi et al.

(Continued)

FOREIGN PATENT DOCUMENTS
EP    1137213 A    9/2001

(Continued)

OTHER PUBLICATIONS

Hatami-Hanza et al, "Demonstration of All-Optical Demultiplexing of a Multilevel Soliton Signal Employing Soliton Decomposition and Self-Frequency Shift", IEEE Photonics Technology Letters, vol. 9, No. 6, Jul. 1997, pp. 833-835.

(Continued)

*Primary Examiner*—Li Liu
(74) *Attorney, Agent, or Firm*—Turocy & Watson, LLP

(57) ABSTRACT

The invention relates to a device and a method for converting WDM signals into an OTDM signal. The device comprises shifting means (102, 103, 104) adapted to introduce a time shift between the pulses of the WDM signals carried by the optical carriers, modulation means (112, 113, 114) adapted to modify the optical power of the WDM signals, an optical temporal multiplexer/demultiplexer (120), a birefringent propagation medium (130) into which the WDM signals are injected in such a manner as to achieve a soliton trapping phenomenon, and absorption means (140) adapted to introduce optical losses into the components of the OTDM signal. This device performs WDM/OTDM conversion at very high bit rates. It also performs OTDM/WDM conversion. It is intended to be installed in long-haul telecommunication networks.

17 Claims, 4 Drawing Sheets

U.S. PATENT DOCUMENTS

Figure 1:
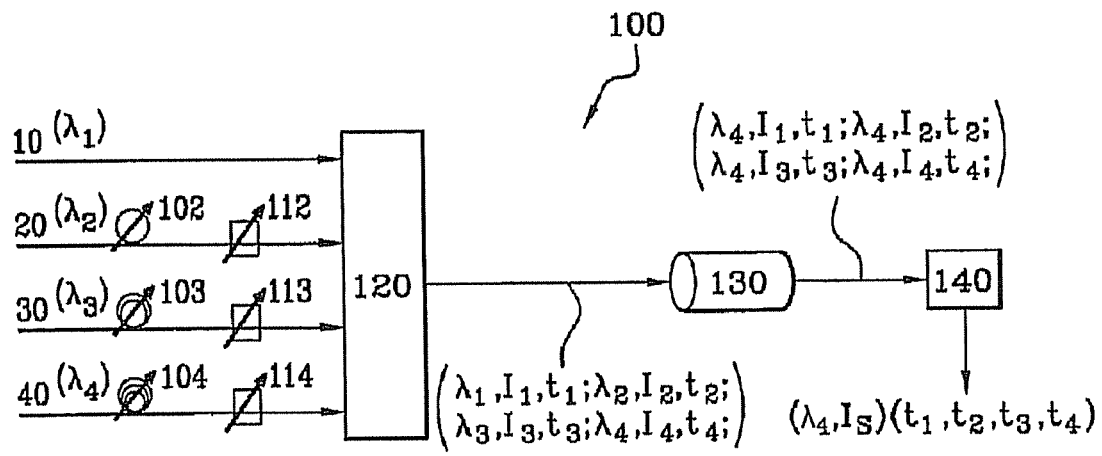

| | | | |
|---|---|---|---|
| 5,889,607 | A | 3/1999 | Suzuki et al. |
| 6,307,658 | B1 | 10/2001 | Chiaroni et al. |
| 6,614,583 | B1 | 9/2003 | Wachsman |
| 7,577,363 | B2 * | 8/2009 | Pincemin .................... 398/75 |
| 2002/0126346 | A1 | 9/2002 | Suzuki et al. |
| 2003/0058490 | A1 | 3/2003 | Brotherton-Ratcliffe et al. |
| 2003/0058500 | A1 | 3/2003 | Sugawara |

OTHER PUBLICATIONS

Islam et al. "Soliton Trapping in Birefringent Optical Fibers", Optical Letters, Sep. 15, 1989, pp. 1011-1013.

Olsson et al., "WDM to OTDM Multiplexing Using an Ultrafast All-Optical Wavelength Converter", IEEE Photonics Technology Letters, vol. 13, No. 9, Sep. 2001, pp. 1005-1007.

International Search Report for PCT Application No. PCT/FR2003/000810.

C.R. Menyuk, "Stability of Solitons in Birefringent Optical Fibers", Optics Letters, vol. 12, No. 8 (1987), pp. 614-616.

Islam et al. "Ultrafast All-Optical Logic Gates Based on Soliton Trapping in Fibers", Optical Letters, vol. 14, No. 22 (1989), pp. 1257-1259.

Menyuk, et al. "Raman Effect in Birefringent Optical Fibers." Optic Letters, vol. 16, No. 8, Apr. 15, 1991, pp. 566-568.

English Translation of Examination Report for European Patent Application No. 03 727 586.4-1237, 4 pages.

EP OA dated Jun. 8, 2010 for European Patent Application No. 03 727 586.4-1237, 1 page.

* cited by examiner

OPTICAL DEVICE AND A METHOD FOR CONVERTING WDM SIGNALS INTO AN OTDM SIGNAL AND VICE VERSA

CROSS-REFERENCES TO RELATED APPLICATIONS

This is a continuation application of U.S. patent application Ser. No. 10/511,227, filed May 24, 2005, which is a U.S. National Stage Entry of International Application No. PCT/FR03/00810, now inactive, which claims priority to French Patent Application No. 02/4968, filed on Apr. 19, 2002, now French Patent No. 2,838,836, issued Aug. 20, 2004, all of which are herein incorporated by reference for all purposes.

The present invention relates to an optical device and a method for converting WDM (wavelength division multiplex) signals comprising simultaneous pulses carried by different wavelengths into an OTDM (optical time division multiplexing/demultiplexing) signal whose components are time shifted and carried by a single wavelength, and vice-versa.

The field of the invention is that of optical telecommunications and more particularly that of long-haul telecommunications. In the present situation of ever increasing bit rates on long-haul transmission networks, increasing the transmission channel bit rate is inevitable, because it reduces the overall size, and more importantly the cost, of the terminal equipment. Accordingly, the next few years should see the deployment on the transport networks of telecommunication operators of the first wavelength division multiplexing (WDM) plant operating at 40 Gbit/s per wavelength and, in the longer term, at 160 Gbit/s per wavelength. This being the case, the requirements of transport networks in terms of optical time division multiplexing/demultiplexing (OTDM) will also increase. This being so, it is particularly beneficial to provide an all-optical WDM/OTDM conversion function, in order to be able to transfer the information conveyed by a plurality of wavelengths to a single carrier, and an all-optical OTDM/WDM conversion function, in order to be able to transfer to a plurality of optical carriers the information contained in an optical channel operating at a very high bit rate, typically at 40 Gbit/s, 160 Gbit/s or 640 Gbit/s. In the latter case, the number of optical carriers involved in the conversion process is equal to the number of OTDM components of the optical signal to be converted. These OTDM components may have a bit rate of 40 Gbit/s or 10 Gbit/s.

Solutions for providing this kind of WDM/OTDM and OTDM/WDM conversion exist already, and include all-electronic solutions that use opto-electronic transponders equipped with photo receivers or laser diodes to effect optical/electronic and electronic/optical conversion. Electronic components then handle time division multiplexing/demultiplexing. Those solutions are complex to implement, however, because they require two-fold optical/electronic and/or electronic/optical conversions and use a large number of components, which makes them difficult to install in the network because of obvious overall size problems. They are also limited in terms of electrical bandwidth. The major drawback of those solutions is that their bit rate is limited because the electronics used are not able to operate at bit rates of 40 Gbit/s and above.

There also exist all-optical solutions in which OTDM/WDM conversion consists in optical time division demultiplexing followed by wavelength conversion. Optical time division demultiplexing uses crossed phase modulation in a fiber, for example. That technology is very complex to implement, however. The optical time division demultiplexing may also be effected by means of non-linear optical mirrors using Mach-Zehnder, Michelson, or Sagnac interferometers. However, non-linear optical mirrors have the drawback of being unstable; their stability is in fact temperature-dependent. Wavelength conversion is effected by semiconductor optical amplifiers (SOA). A laser behind the SOA supplies the wavelength to which the signal must be converted. However, that solution uses a number of SOA and lasers equal to the number of wavelength conversions to be effected, with the result that the cost of that solution is very high, which rules out large-scale deployment in networks that are currently in full expansion. Moreover, SOAs are not completely bit rate transparent and distortion affecting the signal may occur.

WDM/OTDM conversion consists in converting the wavelength of each WDM signal to a single wavelength and then carrying out optical time division multiplexing. Wavelength conversion again necessitates the use of a number of SOA and lasers equal to the number of WDM signals, with the result that the cost of that solution is very high.

Finally, although the solutions described above for the two types of conversion (OTDM/WDM and WDM/OTDM) have the advantage of being all-optical solutions, which simplifies the signal processing system, they are able to operate only at low bit rates, below 40 Gbit/s.

Because of their limitations, the existing solutions cannot be used for WDM/OTDM or OTDM/WDM signal conversion at very high hit rates, that is to say bit rates above 40 Gbit/s.

Accordingly, the technical problem to be solved by the present invention is that of proposing an optical device for converting WDM signals, the pulses of which are simultaneous and carried by different wavelengths, into an OTDM signal, the components of which are time shifted and carried by the same wavelength, and enabling operation at very high bit rates, and thus enabling implementation in long-haul optical transmission networks operating at very high bit rates, typically of 40 Gbit/s and above.

The solution according to the present invention of the technical problem as stated is obtained by the fact that said device comprises:
  shifting means adapted to introduce a time shift between the pulses of the WDM signals carried by the optical carriers,
  modulation means adapted to modify the optical power of the WDM signals,
  an optical spectral and temporal multiplexer/demultiplexer,
  a birefringent propagation medium into which the WDM signals are injected in such a manner as to achieve a soliton trapping phenomenon, and
  absorption means adapted to introduce optical losses into the components of the OTDM signal.

Thus the device of the invention uses the well-known phenomenon of soliton trapping in a birefringent propagation medium, which shifts the optical frequency of the carrier in proportion to the optical power of a signal. By adjusting the optical power of the pulses of a signal beforehand, soliton trapping shifts the wavelength of these pulses toward a "target" wavelength of the optical carrier that is to carry the information.

The present invention solves the technical problem as stated by providing a method of converting WDM signals, whose pulses are simultaneous and carried by different wavelengths, into an OTDM signal, whose components are time shifted and carried by the same wavelength, by means of said device. This method is noteworthy in that it comprises the steps of:
  time shifting the pulses of the WDM signals carried by the optical carriers, attenuating the WDM signals in order for them to have different optical powers, spectrally and temporally multiplexing the WDM signals, injecting the wavelength division multiplex obtained into the birefringent propagation medium in such a manner as to achieve a soliton trapping phenomenon and obtain an OTDM signal, and equalizing the optical power of the components of the OTDM signal obtained.

Another technical problem to be solved by the present invention is that of proposing an optical device able to carry out the opposite conversion, i.e. able to convert an OTDM signal, the components of which are time shifted (t1, t2, t3, t4) and carried by the same wavelength (λ4), into WDM signals, the pulses of which are carried by different wavelengths (λ1, λ2, λ3, λ4), and enabling operation at very high bit rates and implementation in long-haul optical transmission networks.

The solution according to the present invention of this problem is obtained by the fact that said device comprises:

absorption means adapted to introduce optical losses into the components of the OTDM signal, a birefringent propagation medium into which the OTDM signal is injected in such a manner as to achieve a soliton trapping phenomenon, an optical spectral and temporal multiplexer/demultiplexer, and modulation means adapted to modify the optical power of the WDM signals.

The present invention solves this technical problem by providing a method of converting an OTDM signal, whose components are time shifted relative to each other and carried by the same wavelength into WDM signals, whose pulses are carried by different wavelengths, by means of said device. This method is noteworthy in that it comprises the steps of:

attenuating the components of the OTDM signal in such a manner that they have different optical powers, injecting the OTDM signal into the birefringent propagation medium in such a manner as to achieve a soliton trapping phenomenon and recover a wavelength division multiplex, spectrally and temporally demultiplexing the wavelength division multiplex in such a manner as to obtain a plurality of WDM signals whose pulses are time shifted and carried by different wavelengths, and equalizing the optical power of the pulses of the WDM signals obtained.

Figure 2:
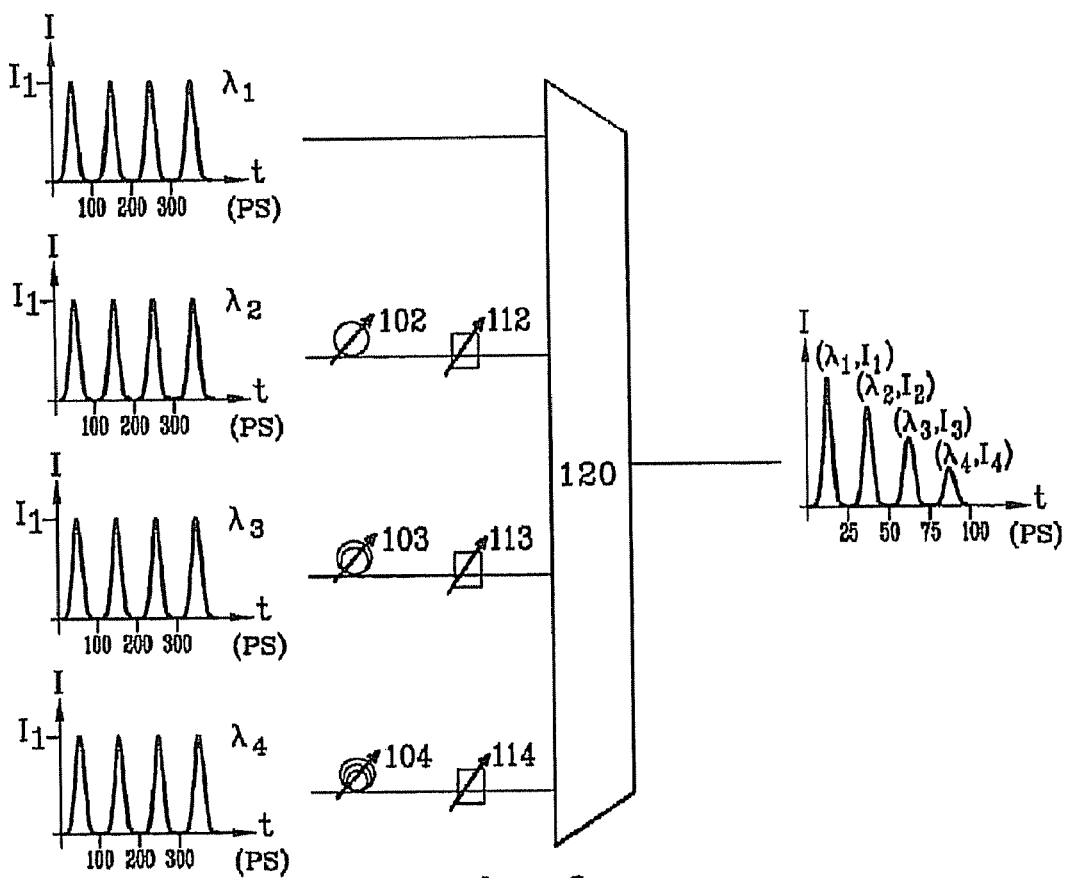
Figure 3:
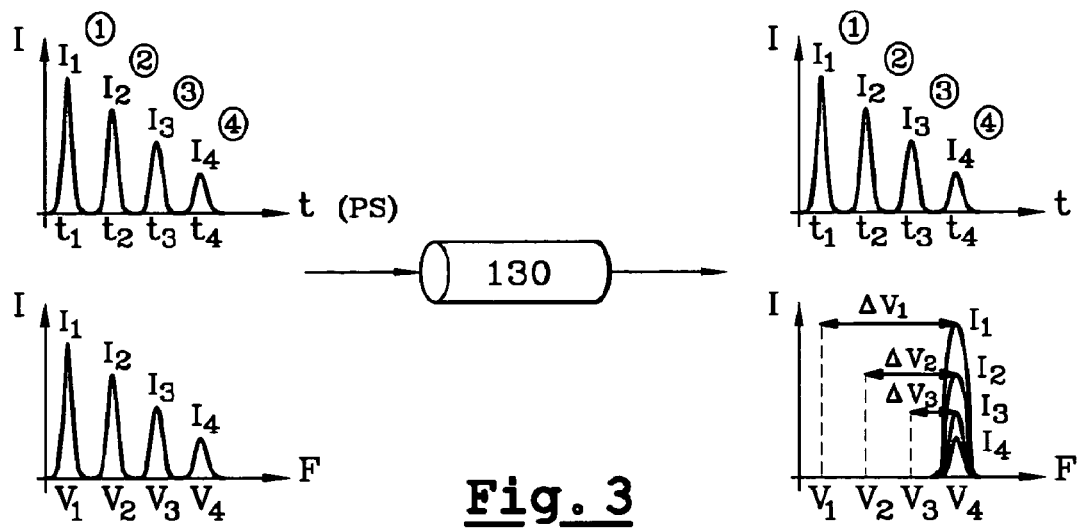
Figure 4:
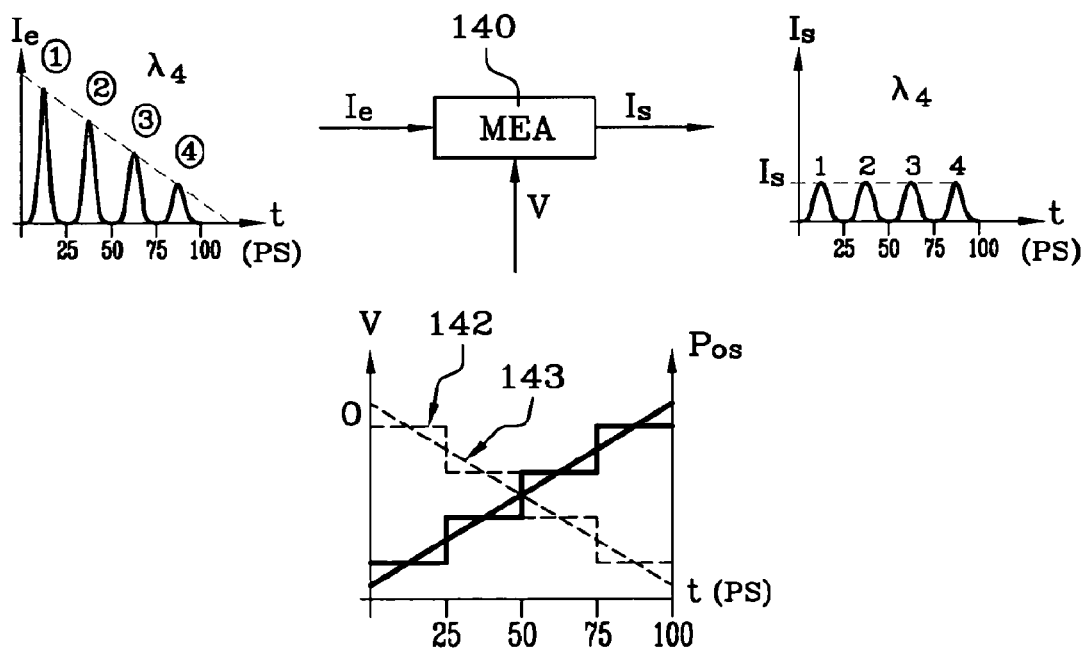
Figure 5:
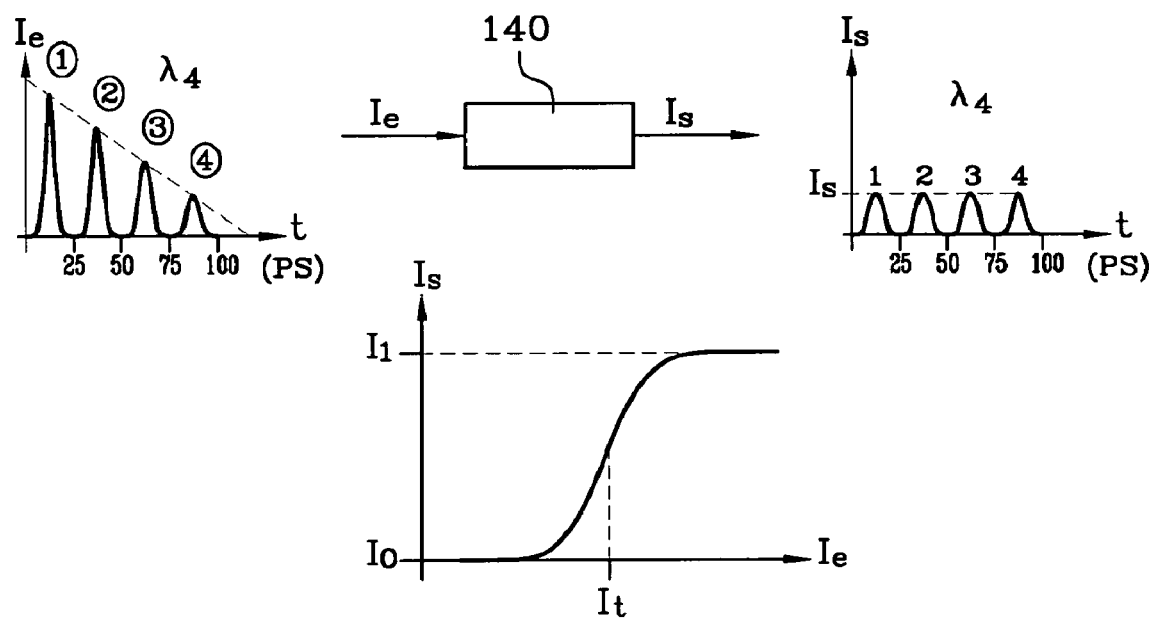
Figure 6:
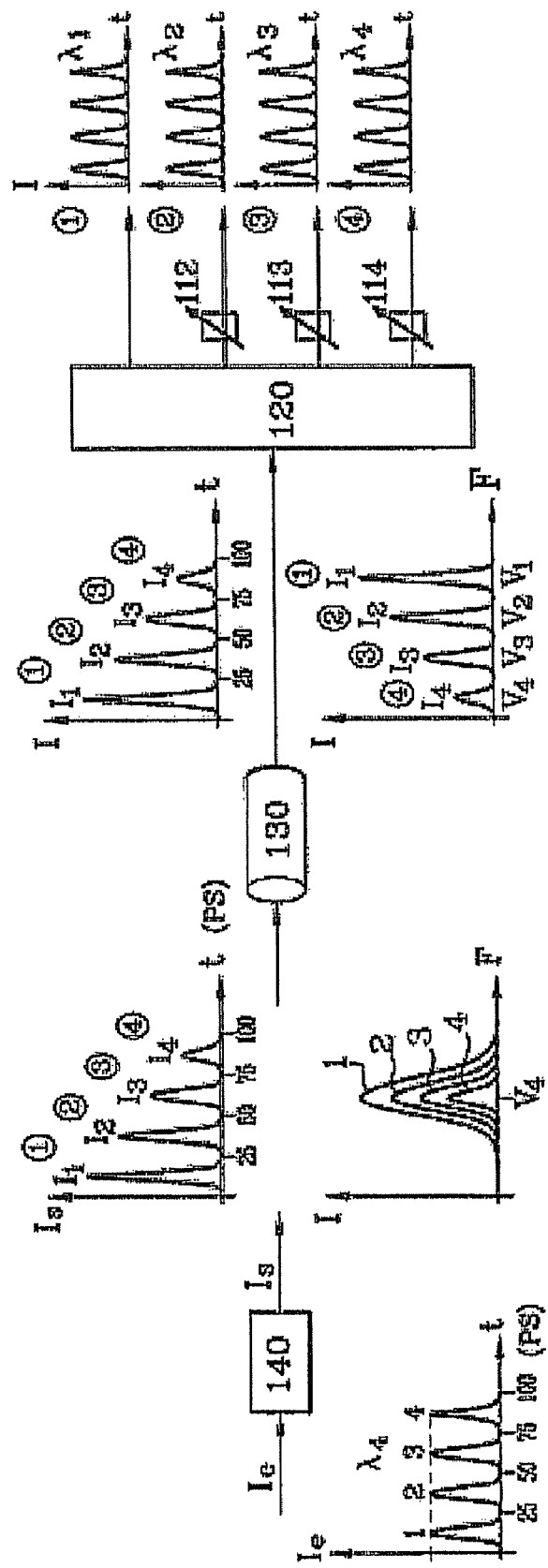

Other features and advantages of the invention will become apparent on reading the following description, which is given by way of illustrative and non-limiting example and with reference to the appended drawings, in which:

FIG. 1 shows a device of the invention used as a WDM/OTDM converter,

FIG. 2 shows WDM signals at the input of the FIG. 1 device and at the output of the spectral and temporal multiplexer, FIG. 3 shows signals at the input and at the output of the birefringent propagation medium of the FIG. 1 device, FIG. 4 shows absorption means used in the FIG. 1 device and signals at the input and the output of the absorption means, FIG. 5 shows different absorption means used in a different embodiment of the FIG. 1 device and signals at the input and output of those absorption means, and FIG. 6 shows a device of the invention used as an OTDM/WDM converter and signals at each stage of conversion.

By way of example, the remainder of the description refers to converting four 40 Gbit/s WDM signals carried by four channels at different wavelengths into a 160 Gbit/s OTDM signal carried by a single channel on a single optical carrier, and vice-versa.

The invention may of course be applied to signals having any bit rate. It is preferably applied to signals having bit rates of 40 Gbit/s, 160 Gbit/s or even 640 Gbit/s.

The WDM/OTDM and OTDM/WDM conversion device is adapted to process signals comprising RZ (return to zero) data which may be of the soliton type or a different type. An RZ signal is a digital signal comprising 0 and 1 states, bits at 1 corresponding to pulses and bits at 0 corresponding to the absence of any pulse in the bit period.

The device 100 in FIG. 1 is used as a WDM/OTDM converter. In this example, it is adapted to convert four 40 Gbit/s WDM signals carried by four channels 10, 20, 30, 40 at different wavelengths λ1, λ2, λ3, λ4, for example, into a 160 Gbit/s OTDM signal carried by a single channel on a single optical carrier at the wavelength λ4.

There are shifting means 102, 103, 104 and modulation means 112, 113, 114 at the output of the four WDM channels. The shifting means, consisting of delay lines, for example, introduce a time shift between the pulses of the WDM signals carried by the optical carriers. This phase shift between the pulses is necessary for subsequent time division multiplexing of the signals.

In this example, only three channels 20, 30, 40 are provided with these delay lines, since it is sufficient for each carrier to have a different shift to the others. There is therefore no need to introduce a time-delay on the first channel 10, although there is nothing to rule this out either, of course.

The delay lines 102, 103, 104 may be fixed and designed to shift each optical carrier by a fixed time period for each signal. It is nevertheless preferable to use variable delay lines in order to be able to adjust and refine the shifts.

The optical modulation means 112, 113, 114 modulate the optical power of the WDM signals and comprise variable attenuators, for example. Accordingly, to attenuate them, different optical losses are induced in each of the WDM signals, for example. There are then obtained WDM signals carried by different wavelengths λ1, λ2, λ3, λ4 at different optical powers I1, I2, I3, I4 that are adjusted to achieve the soliton trapping effect required subsequently.

In this example, only three channels 20, 30, 40 are provided with these attenuators, but each channel may be provided with an attenuator, for the same reasons given for the delay lines. Variable optical attenuators are preferably used to adjust the power of each WDM signal.

In this example, the delay lines 102, 103, 104 precede the optical attenuators 112, 113, 114, but in reality their order is of no importance at this stage. It is sufficient if the WDM signals at the input of the optical multiplexer/demultiplexer 120 have been shifted and modulated.

The optical spectral and time division multiplexer/demultiplexer 120 then multiplexes the WDM signals so that there is only one wavelength division multiplex comprising time shifted (t1, t2, t3, t4) pulses at different wavelengths λ1, λ2, λ3, λ4 and different powers I1, I2, I3, I4.

The multiplex obtained in this way is then injected into birefringent propagation means 130, for example a birefringent optical fiber, to produce the soliton trapping phenomenon and obtain a time division multiplex signal constituting an OTDM signal carried by a single wavelength, the wavelength λ4 in this example.

Absorption means 140 then equalize the optical powers of the components of the final OTDM signal.

FIGS. 2 to 5, being more detailed, enable the operation of this device during WDM/OTDM conversion to be explained more clearly.

FIG. 2 shows the timing diagram of each WDM signal at the input of the device and that of the wavelength division multiplex at the output of the optical spectral and time division multiplexer/demultiplexer 120. At the input of the device, each WDM signal comprises pulses carried by a different wavelength λ1, λ2, λ3, λ4. The pulses of the various WDM signals all have the same intensity I1 and occur simultaneously.

At the output of the multiplexer 120, the multiplex comprises time shifted (t1, t2, t3, t4) pulses at different wavelengths λ1, λ2, λ3, λ4 and different intensities I1, I2, I3, I4.

The pulses of the OTDM signal to be obtained at the output of the device must be interleaved. The shift between two pulses must therefore be identical each time. Accordingly, at 160 Gbit/s, for example, the pulses are shifted relative to each other by 6.25 ps. The shift between the pulses is therefore set and adjusted beforehand by means of the delay lines 102, 103, 104.

The optical power I1, I2, I3, I4 of each pulse of the wavelength division multiplex is adjusted beforehand by means of variable attenuators 112, 113, 114 to exacerbate non-linear effects in the birefringent optical fiber 130 and thereby encourage the required soliton trapping effect, as shown in FIG. 3.

A birefringent propagation medium comprises two main propagation axes. To encourage the soliton trapping phenomenon, the multiplex is injected with a polarization at 45° to the main propagation axes of the birefringent medium 130. In this case, a polarization controller may precede the optical fiber 130, for example, to convert any incoming polarization to another polarization and in particular a linear polarization at 45° to the main axes of the birefringent fiber.

A soliton is a light pulse that is sufficiently intense to excite a non-linear effect that compensates the effects of chromatic dispersion over long distances. Under some conditions, in particular conditions of power and chromatic dispersion well known to the person skilled in the art, the injected pulses 1 to 4 retain their integrity and are not temporally deformed. Their frequency spectrum is deformed, however, and a frequency shift relative to the original frequency of the spectrum of each of these pulses occurs on entering the propagation medium. This phenomenon, during the course of which the pulse is not temporally deformed but the spectrum suffers a frequency shift, is known as soliton trapping. The frequency shift $\Delta \upsilon I$ is proportional to the luminous power $I i$ of the pulse i injected into the propagation medium.

Accordingly, by precisely adjusting the luminous power $I i$ of each pulse i of the wavelength division multiplex, the frequency shift $\Delta \upsilon I$ induced by the soliton trapping phenomenon in the pulse i of the wavelength division multiplex may be adjusted to achieve perfect spectral matching of the spectrum shifts of the WDM channels. This precise adjustment is obtained by means of the variable delay lines and the variable attenuators preceding the multiplexer 120. In the FIG. 3 example, the pulses 1, 2, 3 with respective intensities I1, I2, I3 are subjected to shifts $\Delta \upsilon 1$, $\Delta \upsilon 2$, $\Delta \upsilon 3$ so that their wavelengths all coincide with the wavelength λ4 of the fourth pulse.

An OTDM signal is therefore obtained at the exit from the birefringent medium whose components are time shifted (t1, t2, t3, t4) and carried by a single wavelength λ4.

However, the components of the OTDM signal obtained do not have the same luminous power I1, I2, I3, I4. Absorption means 140 are therefore provided to return all the components of the OTDM signal to the same optical power level.

This power equalization uses an electro-absorption modulator MEA, for example, that applies selective optical losses to the components of the OTDM channel, as shown in FIG. 4. The losses Pos may have a stepped time profile (142) or a linear ramp time profile (143), as shown by the curves of the applied voltage V and the output optical losses Pos as a function of time t. The continuous line curve relates to the applied voltage V and the dashed line curve relates to the output optical losses Pos.

Accordingly, the absorption of the MEA being a function of the applied voltage V and time, the components of the injected signal are not subject to the same absorption on entering the MEA because each has a different intensity and they are time shifted relative to each other. The components 1, 2, 3, 4 then have exactly the same optical power Is at the output of the MEA.

A different embodiment uses a saturable absorber to effect this power equalization, as shown in FIG. 5. The transfer function of a saturable absorber comprises two different states, namely a blocking state when the input power Ie is below a threshold power It and a totally transparent state when the input power is above that threshold power. In the transparent state, the output signal of the saturable absorber has a constant output power Is. If the components of the OTDM signal obtained all have powers I1, I2, I3, I4 above the threshold power It, they all have the same output power Is at the output of the absorber. If, however, the components of the OTDM signal have a power below the threshold power, they are totally absorbed.

The device 100 may also be used to carry out the opposite conversion, i.e. to convert an OTDM signal into WDM signals. This conversion uses the same device in the opposite direction. It is therefore described more succinctly, and with reference to FIG. 6, which shows the device used as an OTDM/WDM converter and the signals at each stage of the conversion.

The OTDM signal is initially passed through absorption means 140 in order for selective optical losses to be applied to its components. The absorption means comprise the electro-absorbent modulator MEA described above, for example. The components of the OTDM signal do not suffer the same absorption and therefore suffer different optical losses.

The OTDM signal obtained is then injected into the birefringent optical fiber 130 to achieve the soliton trapping effect described above. In this case, the components of the OTDM spectrum are subjected to a frequency shift $\Delta \upsilon I$ proportional to their optical power. A wavelength division multiplex is therefore obtained whose pulses 1, 2, 3, 4 are time shifted relative to each other and carried by different wavelengths λ1, λ2, λ3, λ4 and have different optical powers I1, I2, I3, I4.

Just as for WDM/OTDM conversion, a polarization controller may precede the optical fiber 130, for example, to facilitate injection of the signal with a polarization at 45° to the main axes of the optical fiber.

The next step is to pass the wavelength division multiplex through the multiplexer/demultiplexer 120 in order to demultiplex it spectrally and temporally and to obtain four signals at different wavelengths λ1, λ2, λ3, λ4.

The final step is to equalize the optical powers of the pulses of the WDM signals. This is effected by the modulation means 112, 113, 114, which comprise variable attenuators as described above, for example.

It is not essential to use the FIG. 1 shifting means 102 to 104 for the OTDM/WDM conversion. If those means, for example delay lines, are used, they time shift the pulses carried by the optical carriers of the WDM signals in such a manner as to render them simultaneous.

The device that has just been described is no more than an illustration of the invention, which is in no way limited to this example and has applications in high bit rate long-haul optical telecommunications.

The device has the advantage of being all optical and is easy to implement and to install in the network. It uses no laser sources, only low-cost components, and is independent of bandwidth. Finally, the device is of very great benefit for the incoming generations of high bit rate transmission systems operating at bit rates of 40 Gbit/s and above.

The invention claimed is:

1. An optical device, comprising:
    one or more delay lines, at least one of the one or more delay lines configured to introduce a time shift into at least one of a plurality of input signals to provide one or more of the plurality of input signals with a plurality of different time shifts;
    one or more modulators, at least one of the one or more modulators configured to modulate an optical power of at least one of the plurality of input signals, to provide one or more of the plurality of input signals with a plurality of different optical power levels;
    an optical multiplexer, configured to multiplex the plurality of input signals into a multiplexed signal including a plurality of components corresponding to the plurality of input signals;
    a birefringent optical fiber, configured to receive the multiplexed signal and introduce a frequency shift into at least one of the plurality of components to produce an optical time division multiplexing (OTDM) signal, wherein an amount of the frequency shift introduced into the at least one of the plurality of components corresponds to the optical power level of the at least one of the plurality of components; and
    a power equalizer, configured to adjust the optical power of one or more of the plurality of components whereby the plurality of components have substantially similar optical power levels.

2. The optical device of claim 1, wherein at least one of the one or more delay lines is a variable delay line.

3. The optical device of claim 1, further comprising:
    a polarization controller, configured to be at an entry of the birefringent optical fiber and to convert a polarization of the plurality of components to a linear polarization at a fixed angle to one or more axes of the birefringent optical fiber.

4. The optical device of claim 3, wherein the polarization controller is further configured to convert the polarization of the plurality of components to a linear polarization at 45° to one or more of the axes of the birefringent optical fiber.

5. The optical device of claim 1, further comprising N delay lines and N modulators and configured to receive P input signals, wherein both N and P are integers greater than zero, and wherein N is less than P.

6. The optical device of claim 1, wherein the optical device is configured to adjust the frequency shift introduced by the birefringent optical fiber into the at least one of the plurality of components to achieve a spectral matching of the plurality of components.

7. The optical device of claim 1, wherein the at least one of the plurality of input signals are carried on different wavelengths.

8. The optical device of claim 1, wherein the power equalizer comprises an electro-absorption modulator configured to adjust the optical power of the at least one of the plurality of components of the OTDM signal according to a linear-ramp-time profile.

9. The optical device of claim 1, wherein the power equalizer comprises a saturable absorber.

10. The optical device of claim 9, wherein the saturable absorber has a blocking state and a transparent state, wherein the saturable absorber is in the blocking state when an input power of a given component of the OTDM signal is below a power threshold, and wherein the saturable absorber is in the transparent state when the input power of the given component is above the power threshold.

11. The optical device of claim 1, wherein the power equalizer comprises an electro-absorption modulator configured to adjust the optical power of the one or more of the plurality of components according to a stepped-time profile.

12. An optical device, comprising:
    a modulator, configured to individually modulate an optical power of at least one of a plurality of components of an optical time division multiplexing (OTDM) signal, to provide the plurality of components with a plurality of different optical power levels;
    a birefringent optical fiber, configured to receive the OTDM signal including the plurality of components with the plurality of different optical power levels and introduce a frequency shift into at least one of the plurality of components to produce a multiplexed signal including the plurality of components with the plurality of different optical power levels having a plurality of different wavelengths, wherein an amount of the frequency shift introduced into the respective at least one of the plurality of the components corresponds to the optical power level of the respective at least one of the plurality of the components;
    an optical demultiplexer, configured to demultiplex the multiplexed signal into a plurality of output signals with the plurality of different optical power levels and having the plurality of different wavelengths; and
    one or more power equalizers, at least one of the one or more power equalizers configured to adjust an optical power of a respective one of the plurality of output signals to provide the plurality of output signals with substantially similar optical power levels.

13. The optical device of claim 12, further comprising:
    a polarization controller, configured to be at an entry of the birefringent optical fiber and to facilitate injection of at least one of the plurality of components at a fixed angle to one or more axes of the birefringent optical fiber.

14. The optical device of claim 13, wherein the polarization controller is further configured to facilitate the injection of the at least one of the plurality of components at 45° to one of more of the axes of the birefringent optical fiber.

15. The optical device of claim 12, wherein the optical device comprises N power equalizers and is configured to receive an input signal with P input components, wherein N and P are both integers greater than 0, and wherein N is less than P.

16. The optical device of claim 12, wherein the modulator comprises an electro-absorption modulator configured to adjust the optical power of the at least one of the plurality of components according to a stepped-time profile.

17. The optical device of claim 12, wherein the modulator comprises an electro-absorption modulator configured to adjust the optical power of the at least one of the plurality of components according to a linear-ramp-time profile.

* * * * *

UNITED STATES PATENT AND TRADEMARK OFFICE
CERTIFICATE OF CORRECTION

PATENT NO.         : 7,844,180 B2
APPLICATION NO.    : 12/434796
DATED              : November 30, 2010
INVENTOR(S)        : Pincemin It is certified that error appears in the above-identified patent and that said Letters Patent is hereby corrected as shown below:

Title page, item (54), under "Title", in Column 1, Line 3, delete "VICE VERSA" and insert -- VICE-VERSA --.

Column 1, line 3 (in the Title), delete "VICE VERSA" and insert -- VICE-VERSA --.

Column 1, line 48, delete "opto-electronic" and insert -- optoelectronic --.

Column 2, line 26, delete "hit" and insert -- bit --.

Column 5, line 9, delete "$\lambda$ 1," and insert -- $\lambda 1$, --.

Signed and Sealed this
Ninth Day of August, 2011

David J. Kappos
*Director of the United States Patent and Trademark Office*